No. 637,914. Patented Nov. 28, 1899.
E. F. WOODMAN.
ELECTRIC ALARM SYSTEM AND APPARATUS FOR TESTING SAME.
(Application filed Mar. 9, 1899.)
(No Model.) 3 Sheets—Sheet 1.
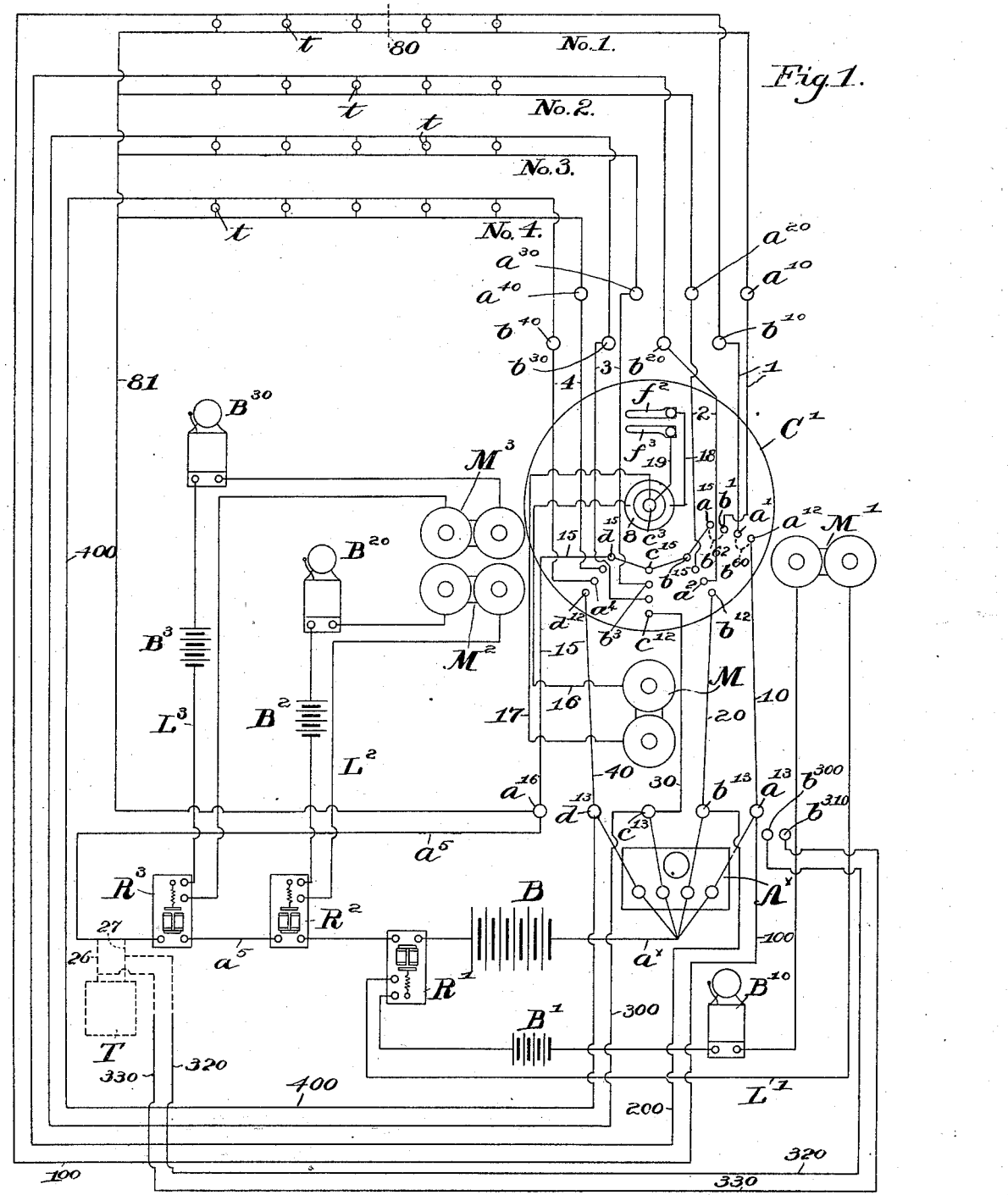

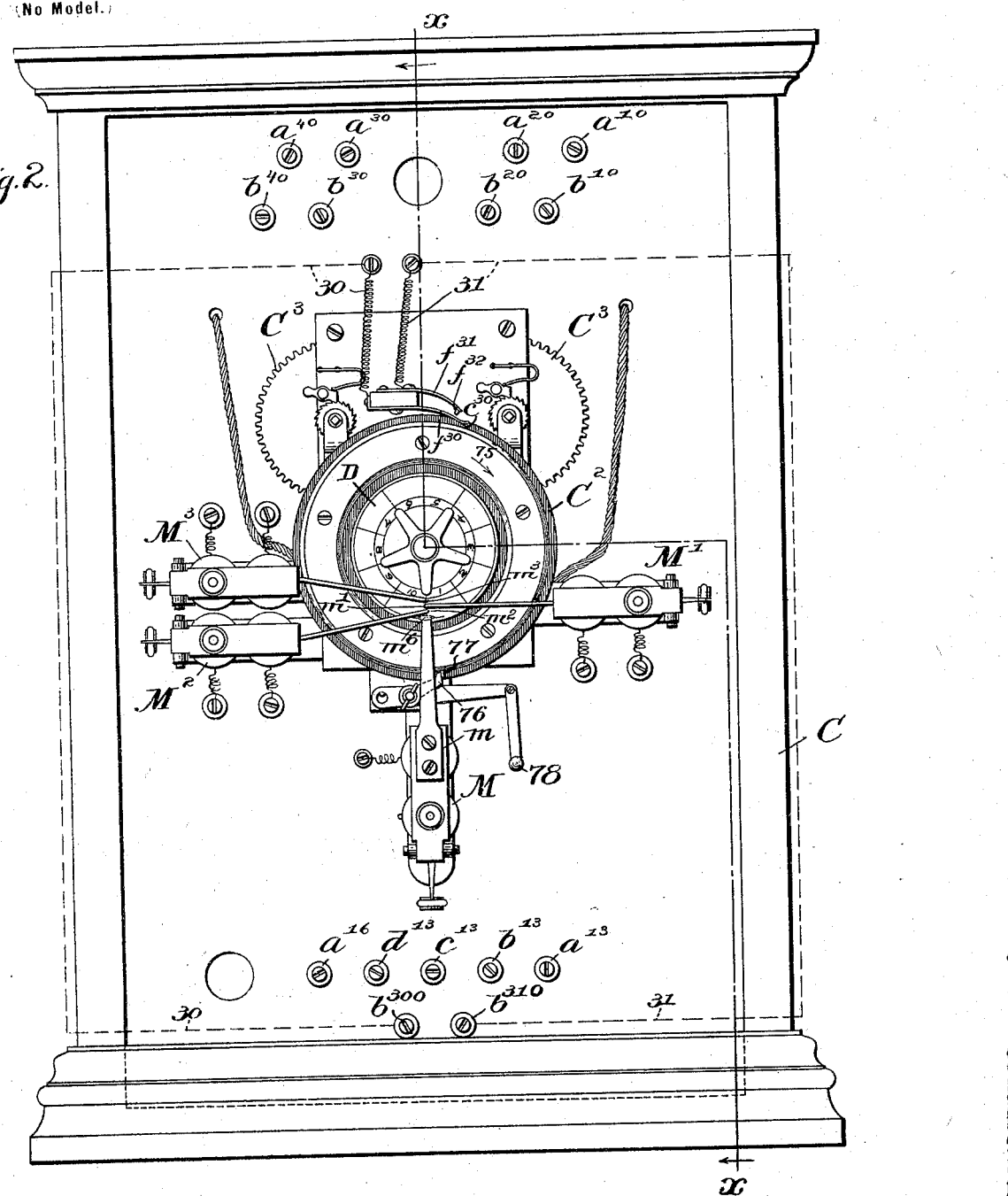

No. 637,914. Patented Nov. 28, 1899.
E. F. WOODMAN.
ELECTRIC ALARM SYSTEM AND APPARATUS FOR TESTING SAME.
(Application filed Mar. 9, 1899.)
(No Model.) 3 Sheets—Sheet 3.
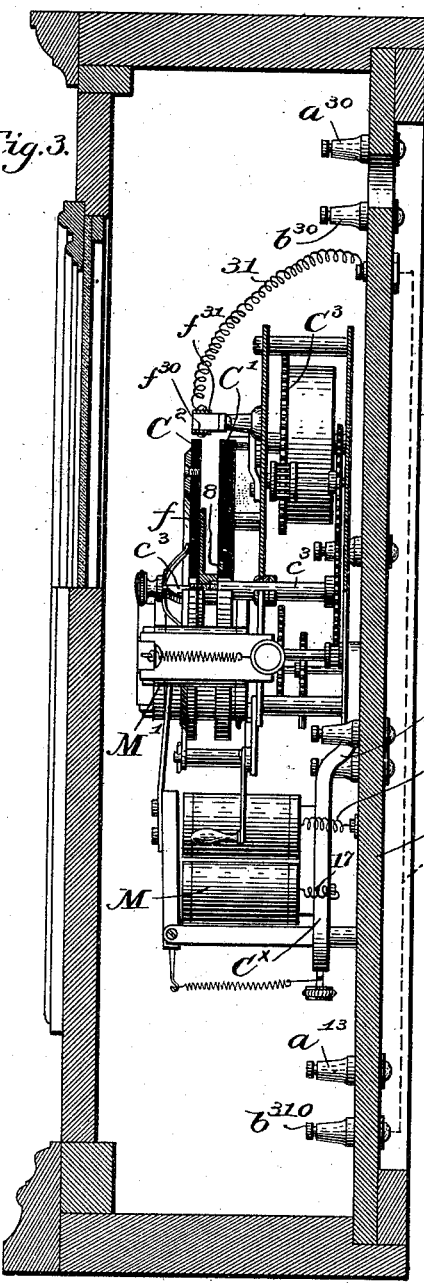
Witnesses,
Charles F. Logan.
Thomas F. Drummond
Inventor;
Edward F. Woodman,
by Crosby Gregory.
Atty's

UNITED STATES PATENT OFFICE.

EDWARD F. WOODMAN, OF BOSTON, MASSACHUSETTS, ASSIGNOR TO THE NATIONAL FIRE APPLIANCE COMPANY, OF SAME PLACE.

ELECTRIC ALARM SYSTEM AND APPARATUS FOR TESTING SAME.

SPECIFICATION forming part of Letters Patent No. 637,914, dated November 28, 1899.

Application filed March 9, 1899. Serial No. 708,305. (No model.)

*To all whom it may concern:*

Be it known that I, EDWARD F. WOODMAN, a subject of the Queen of Great Britain, residing at Boston, county of Suffolk, and State of Massachusetts, have invented an Improvement in Electric Alarm Systems and Testing Apparatus Therefor, of which the following description, in connection with the accompanying drawings, is a specification, like letters and figures on the drawings representing like parts.

This invention relates to electric alarm systems employed for the protection of buildings, and particularly to those wherein the system includes a series of thermostats located in the building or buildings equipped, whereby an alarm is given at one or more predetermined stations when the operation of a thermostat is effected by an abnormal temperature. It is necessary in many localities in order to comply with insurance regulations to provide such an alarm system with one or more outside or local circuits, which shall give an alarm when the main alarm-circuit is operated, such local circuits being preferably provided with a vibrating bell for sounding the alarm. These local circuits should be so constructed and arranged that when a test is made of the system not only will the condition of the main alarm-circuit be indicated, but also that of each and every local circuit forming a part of the system.

My present invention has for its object the production of an electric alarm system so constructed and arranged that the local circuits if operative will always be in condition to automatically and separately record their operation when an alarm is given by or through the main circuit, and if not operative to indicate that fact, and in connection with such system I employ a novel testing apparatus whereby a separate and distinct test of the condition of the main and each local circuit is made and recorded. By the testing apparatus referred to the giving of the alarm or its failure will be indicated for each local circuit, as well as the character of the alarm. That is, with a vibrating bell in the local circuit the proper operation of the bell will be indicated or its improper operation—as, for instance, if but a single stroke occurs—and the total failure of the alarm to operate will also be indicated, so that at a glance the operation of the entire system may be noted and faults, if any, corrected.

Figure 1 is a diagrammatic view of an electric alarm system embodying my invention, with a portion of the testing apparatus in connection therewith. Fig. 2 is a front elevation of the testing apparatus mounted on a suitable base, with the terminals for the main and local circuits and the main and local circuit electromagnets. Fig. 3 is a right-hand side elevation and partial section of the testing apparatus, taken on the line $x\,x$, Fig. 2. Fig. 4 is an inner face view of the movable insulating plate or carrier which supports the circuit-controlling devices. Fig. 5 is an outer face view of the insulating-plate containing the fixed terminals of the several alarm-circuits and with which the movable circuit-controlling devices coöperate. Fig. 6 is side elevation of the recording-armature of a local-circuit magnet; and Fig. 7 is a detached view of an indicator or test card, showing two tests recorded.

Herein I have shown a series of alarm-circuits, four in number, which may, for instance, extend throughout a building on the different stories, denoting the first-story circuit as No. 1, the second-story No. 2, and so on, with three local circuits $L'\,L^2\,L^3$; but it will be apparent hereinafter that a greater or less number of main or alarm circuits may be employed and one or more local circuits without departing from the spirit and scope of my invention. I have herein shown normally-open alarm-circuits of the "duplex" type, with the thermostats $t$, the latter operating to close the circuit upon a predetermined rise in temperature and thereby turn in an alarm, the term "duplex" meaning that each alarm-circuit comprises two circuits complete in themselves, with the thermostats bridging or connected to the latter, so that the severance of both wires of the alarm-circuit will not disable it, as will be explained hereinafter, and these metallic circuits are also shown as connected with a fire-alarm system, as will be described, a suitable battery B, Fig. 1, being provided to furnish the requisite current, while each local circuit is provided with its own battery, as B' B², &c., and a vibrating bell, as B¹⁰ B²⁰ B³⁰.

An annunciator A^× is connected with the system, provided with drops corresponding to the several alarm-circuits and in circuit therewith, as shown in Fig. 1.

The several local circuits are coupled with or connected to the main circuit by suitable relays R' R², &c., the relay-coils being included in the main circuit and the armatures being included in the local circuits, it being supposed that the bells in said local circuits will be installed in the houses or offices of different persons connected with the building provided with the alarm system, so that the alarm will be given to each of such individuals, and it will be observed that the local circuits are thus always and permanently coupled with the main or alarm circuit. Each local circuit includes an electromagnet, as M' M², &c., which latter are shown as grouped about the dial of the testing apparatus, the several armatures in the present instance being provided each with a point or stylus, as $m'$ $m^2$ $m^3$, Fig. 2, adjacent the face of the dial and arranged radially to the center thereof, for a purpose to be described.

The testing apparatus is herein shown as mounted in a suitable box or case C and includes, essentially, a fixed disk C' of insulating material suitably mounted on the metallic frame C^× and a coöperating rotatable disk C² of insulating material mounted adjacent and parallel to the disk C' upon a metal arbor $c^3$, held in suitable bearings on the frame and driven by a clock mechanism C³ of any usual construction. The disk C' is shown separately in Fig. 5, having arranged upon it the terminals $a'$ $b'$, $a^2$ $b^2$, $a^3$ $b^3$, &c., of the several individual circuits No. 1, No. 2, &c., the latter being led into the casing to suitable binding-posts $a^{10}$ $b^{10}$, $a^{20}$ $b^{20}$, &c., connected, respectively, by wires 1 2 3 4 with the terminals on the disk C', as best shown in Fig. 1. These terminals are shown as located in radial lines on the said disk and also in arcs concentric with its center, and on an outer arc I have provided terminals $a^{12}$ $b^{12}$, &c., connected by wires 10 20 30, &c., with terminals $a^{13}$ $b^{13}$ in circuit with the annunciator A^× and thence by wire $a^×$ to battery B.

Inside the line-terminals $a'$ $b'$, &c., I have shown a series of terminals $a^{15}$ $b^{15}$, &c., which are connected to each other by wire 15 and thence by the wire $a^5$ to the battery B.

A magnet M, mounted on the metallic frame C^× of the testing apparatus, is in circuit by wire 16 with a metal ring 8 in the disk C' and with the metallic arbor $c^3$ through the frame C^× and wire 17. The armature $m$ of said magnet is preferably provided with a toothed wheel $m^6$, which when the magnet is energized is brought down upon a test-card D of paper or other suitable material carried on the outer face of the disk, said cards being removable and serving as a recording-dial for the testing apparatus, and by referring to Fig. 2 it will be seen that the toothed wheel $m^6$ and the several styluses $m'$ $m^2$, &c., are arranged in a line radial to the center of the dial, so that each can make its own record thereupon independently of the others. Each stylus indents the dial once for each vibration of the bell included in the corresponding local circuit, and as the disk C² rotates when a test is made the record of a properly-operating local circuit will be a series of dots or indentations, while a single stroke of the bell will be recorded as a dash or continuous mark. Should a local circuit be out of order, the corresponding stylus will make no record whatever on the dial, thus indicating clearly that the bell did not ring.

The magnet M is brought into circuit only when making a test of the system, and at such time the toothed wheel $m^6$ will make a series of indentations on the indicator-card D.

Referring to Fig. 7, I have shown one of the indicator-cards separately, divided segmentally and each space corresponding to an alarm-circuit of the system, and in the first space the result of a test for No. 1 circuit is shown, the dotted line 50 indicating by its series of dots that the local circuit L³ was in proper condition, its bell vibrating during the test. The dash 51 indicates that the bell of the local circuit L' made but a single vibration, the stylus $m'$ remaining in contact with and tearing or continuously indenting the dial. The local circuit L² failed to operate at all, no mark having been made by its stylus $m^2$. The dotted line 53 is the test indication for the alarm-circuit No. 1 of the system. The second section of the dial shows a similar state of affairs so far as regards local circuits L' and L², it being understood that this second space records the test for alarm-circuit No. 2. The tests for alarm-circuits 3 and 4 of the system herein illustrated would be recorded in the third and fourth spaces of the dial. Should the entire system be in proper operative position when the test is made, each section of the dial will show a series of dots for the alarm-circuit and as many additional series of dots as there are local or outside circuits.

In normal condition the several circuits are in the state shown in diagram Fig. 1, each alarm-circuit being open at each thermostat and, as will be described, the terminals, as $a'$ $b'$, of circuit No. 1 are in circuit with the battery B by connections with the terminals $a^{12}$ $a^{15}$, respectively. Taking circuit No. 1, should a thermostat at the right of the dotted line 80, Fig. 1, operate, the circuit will be completed through post $b^{10}$, wire 1, terminals $a'$ $a^{12}$, and wire 10 through annunciator A^×, wire $a^×$, battery B, wires $a^5$ and 15 to terminals $a^{15}$ $b'$, thence by second wire 1 of the pair to thermostat, it being observed that the circuit is completed through the testing apparatus, and any other of the alarm-circuits can be traced in a similar manner. Should the circuit be impaired between the dotted line 80, Fig. 1, and the testing apparatus, the alarm will still be given, for if a thermostat to the left of said line operates the circuit can be traced as follows: from thermostat by wire 100 to post $a^{13}$, annunciator, wire $a^\times$ to battery, wire $a^5$ to post $a^{16}$, and common return-wire 81 to thermostat, the testing apparatus in this instance being excluded from the circuit; but in either case the several local circuits will be operated through their respective relays, the line 80 serving merely to indicate some point of the circuit at which a break may occur, and correspondingly for any other alarm-circuit of the system. The other circuits are connected by the wires 200 300, &c., with the posts $b^{13}$ $c^{13}$, &c. Now in order to normally connect the terminals of the several circuits with the terminals $a^{12}$ $a^{15}$, $b^{12}$ $b^{15}$, &c., and thereby include the battery B and annunciator, the disk $C^2$ is provided on its inner face with a pair of circuit breakers or bridges for each alarm-circuit of the system, it being necessary to describe only one pair, though in Fig. 4 the proper number are shown for the four circuits herein illustrated. The bridges are shown as bifurcated metal arms $b^{60}$ $b^{62}$, Fig. 4, arranged side by side and secured to the insulating-disk $C^2$, the branches 120 and 122 of bridge $b^{60}$ normally resting upon the terminals $a^{12}$ $a'$, respectively carried by the disk $C'$, while the branches 124 and 126 of the other bridge $b^{62}$ rest upon the terminals $b'$ and $a^{15}$, respectively, the dotted loops $b^{60}$ and $b^{62}$ on Fig. 1 diagrammatically representing the two bridges when the system is in normal condition. The direction of rotation of the disk $C^2$ is indicated by arrow 75, Fig. 4, a latch 76, Fig. 2, normally holding the disk from rotation by its engagement with a stop 77 on said disk, withdrawal of the latch by a suitable handle 78 releasing the disk and permitting the clock mechanism $C^3$ to effect a single rotation of the disk. When such test is made, the pairs of bridges described will be withdrawn from the normally-engaged series of terminals and break the several alarm-circuits, and these terminals are successively closed to test each circuit by the rotation of the disk $C^2$, which carries upon its inner face two separated circuit closers or changers $f^2$ $f^3$, located beyond the last pair of bridges thereupon, as clearly shown in Fig. 4. The circuit-changer $f^3$ is connected by a wire 19 with the metal plate $f$, secured to the disk and contacting with the arbor $c^3$, so that by said arbor and the frame $C^\times$ of the testing device the circuit-changer $f^3$ is electrically connected with the magnet M. A contact-finger $f'$, mounted upon, but insulated from, the plate $f$, is adapted to wipe over and maintain continuous contact with the metallic ring 8 of the disk $C'$, a wire 18 connecting said finger 8 and the circuit-changer $f^2$.

To avoid confusion, in Fig. 1 the circuit-changers are not shown in their proper position relative to the apparatus, but more to show their electrical connection with the rest of the apparatus, said circuit-changers being so positioned on the disk $C^2$ that when it rotates they will successively contact with the terminals $a'$ $b'$, $a^2$ $b^2$, &c., when the bridges are inoperative, to thereby short-circuit one alarm-circuit after another through the testing apparatus and include the magnet M for each of such circuits. Referring to Fig. 1, let it be supposed that, as described, the circuit-changers $f^2$ $f^3$ are respectively in contact with the terminals $a'$ and $b'$ of circuit No. 1. The latter will be completed as follows: terminal $a'$ $f^2$, wire 18 to ring 8, wire 16 to magnet M, wires 17, frame of testing device, arbor $c^3$, wire 19, circuit-changer $f^3$, terminal $b'$, right-hand wire 1, common return 81 and wire $a^5$ to battery B, wire $a^\times$ through annunciator to post $a^{13}$, wire 100 to individual circuit No. 1, post $b^{10}$, and inside wire 1 back to terminal $a'$, and the energizing of the magnet M will cause its armature to make a record on the dial D, preferably through the use of the toothed wheel $m^6$. At the same time the usual local circuits will have been operated through their relays, and if the bells therein have operated properly or improperly or if they have failed to operate the condition of each local circuit will be indicated on the dial D, as has been described.

What has been said of alarm-circuit No. 1 is true of each of the others, the tests thereof being made and indicated in the successive spaces on the dial as the disk $C^2$ rotates.

Should an alarm-circuit be out of order, the magnet M will not be energized during its test and no record will be made on the dial, showing instantly not only that an alarm-circuit is out of order, but also indicating which circuit requires attention.

From the foregoing it will be obvious that the testing is automatic, the only manual operation required being the withdrawal of the latch 76 to inaugurate the action of the testing device. The local circuits are always "in circuit" with the several alarm-circuits, thus obviating the shunting of said local circuits into or out of operation and preventing the harmful results which might ensue from the carelessness or forgetfulness of the attendant charged with the duty of making the tests. With the indications of the test-dial it is impossible for individuals on the local circuit to wrongfully allege the improper operation of the local bells, as the actual operation of the bell is clearly indicated on the test-dial.

I have herein shown the system connected with a fire-alarm system of efficient character, the transmitter T (see dotted lines, Fig. 1) being connected with the main circuit at 26 27, and I have also provided means whereby when a test is being made the fire-alarm system will be automatically cut out.

Referring to Fig. 2, the frame of the testing device has mounted upon it two normally-separated circuit-closers or pens $f^{30}$ $f^{31}$, insulated from each other and attached to wires 30 and 31, leading to binding-posts $b^{300}$ $b^{301}$ in the casing C. Wires 320 330 lead from said posts to the transmitter connections 26 and 27, respectively, so that when the circuit-closers $f^{30}$ $f^{31}$ are brought into contact the transmitter will be short-circuited. The pen $f^{30}$ normally rests in a notch $c^{30}$ in the edge of the insulating-disk $C^2$, (more clearly shown in Fig. 4,) so that the point $f^{32}$ of the pen $f^{31}$ will be separated from $f^{30}$; but when the disk begins to rotate the pen $f^{30}$ will be lifted to contact with the point $f^{32}$ to effect the short-circuiting of the fire-alarm system. When the disk has made one revolution and comes to rest, the pen $f^{30}$ snaps back into the recess $c^{30}$ and the fire-alarm system is automatically brought into circuit.

My invention is not restricted to the precise construction and arrangement herein shown and described, as the same may be varied or rearranged without departing from the spirit and scope of my invention.

Each electromagnet and its armature, with the recording or indicating portion of the latter, constitutes an "indicating device," as it may be termed, and it will be manifest that the indicating device in each local circuit is responsive to a change in any one of the main or alarm circuits, whether such change is due to the action of a thermostat or to the operation of the testing apparatus; but the indicating device comprising the magnet M and its armature is operative only when brought into an alarm-circuit by or through the operation of the testing apparatus. Accordingly I have in the claims hereinafter denoted this device as a "test-indicating device" to clearly distinguish it from the indicating device included in or forming a part of each local circuit.

Having described my invention, what I claim as new, and desire to secure by Letters Patent, is—

1. A protective system comprising a main alarm-circuit including one or more devices to change said circuit under abnormal conditions, a test-indicating device therefor, one or more local circuits each having an indicating device responsive to a change in the main circuit, and a testing apparatus adapted upon operation to connect said test-indicating device with the main circuit, and through the latter to effect the operation of the local-circuit indicating device, whereby the condition of said main and local circuits will be indicated.

2. A protective system comprising a duplex, open, main alarm-circuit, a test-indicating device therefor, one or more local circuits each having an indicating device responsive to a change in the main circuit, and a testing apparatus adapted upon operation to connect said test-indicating device with the main circuit, to be actuated thereby, the operation of each local-circuit indicating device being also effected by or through the main circuit when a test is made.

3. A protective system comprising a plurality of duplex normally-open alarm-circuits provided with thermostats to close the same upon an undue rise of temperature, a test-indicating device for said alarm-circuits, one or more local circuits each having an indicating device responsive to a change in any alarm-circuit, and a testing apparatus adapted upon operation to successively connect said test-indicating device with the several alarm-circuits, to be actuated thereby, the operation of each local-circuit indicating device being also effected by or through each alarm-circuit when a test is made.

4. A protective system comprising a plurality of duplex, normally-open alarm-circuits provided with thermostats to close the same upon an undue rise of temperature, a test-indicating device for said alarm-circuits, one or more local circuits each having an indicating device responsive to a change in any alarm-circuit, and a testing apparatus including a recording-dial, said testing apparatus upon its operation successively connecting the test-indicating device with the several alarm-circuits, to be actuated thereby, the said device and the indicating device of each local circuit coöperating with the dial to indicate thereupon the condition of the alarm and local circuits when a test is made of the system.

5. A protective system comprising a main alarm-circuit including one or more devices to change said circuit under abnormal conditions, a test-indicating device therefor, one or more local circuits each having an indicating device responsive to a change in the main circuit, and a testing apparatus including a recording-dial adjacent to which the several indicating devices are located, said testing apparatus being adapted upon operation to connect the test-indicating device with the main circuit, and by or through the latter to effect the operation of the local-circuit indicating device, the said indicating devices by coöperation with the dial of the testing apparatus recording separately the condition of the several circuits comprised in the system when a test is made.

6. A protective system comprising a main alarm-circuit including one or more devices to change said circuit under abnormal conditions, a test-indicating device therefor, one or more local circuits having each an indicating device, to automatically and separately indicate the operation of a local circuit when an alarm is given by or through the main circuit, and a testing apparatus adapted upon operation to connect said test-indicating device with the main circuit, and through the latter to also effect a test operation of each local circuit and its indicating device, whereby the condition of the circuits comprised in the system will be indicated.

7. A protective system comprising a main alarm-circuit including one or more devices to change said circuit under abnormal conditions, a test-indicating device therefor, including a recording member, one or more local circuits each having a vibrating bell and an indicating device responsive to a change in the main circuit, said indicating device including a recording member vibratable in unison with the bell, and a testing apparatus having a rotatable dial, the operation of said testing apparatus connecting said test-indicating device with the main circuit, and through the latter also effecting the operation of the local-circuit indicating device, whereby the recording members of said indicating devices will denote upon the dial the operative condition of the several circuits and the operation of the local-circuit bell when a test is made.

8. A protective system comprising a plurality of duplex, normally-open alarm-circuits, a common test-indicating device for said alarm-circuits, one or more local circuits each having an indicating device responsive to a change in any alarm-circuit, and a testing apparatus comprising a rotatable disk, actuating means therefor, circuit-closers on said disk in circuit with the test-indicating device and adapted to contact successively with the terminals of the several alarm-circuits and thereby effect a test operation of said indicating device for each circuit, circuit-breakers on said disk, to open the alarm-circuits in advance of the movement of the circuit-closers, and a dial to coöperate with the test and local-circuit indicating device and record the condition of the several circuits in the system.

9. A protective system comprising a plurality of duplex, normally-open alarm-circuits, a common test-indicating device for said alarm-circuits, one or more local circuits each having an indicating device responsive to a change in any alarm-circuit, and a testing apparatus adapted upon operation to successively connect said test-indicating device with the several alarm-circuits, to be actuated thereby, the operation of each local circuit being also effected by or through each alarm-circuit when a test is made, combined with a fire-alarm system, and means controlled by the testing apparatus to automatically cut out the fire-alarm system during the operation of said apparatus.

10. A protective system comprising a plurality of duplex, normally-open alarm-circuits, a common test-indicating device for said alarm-circuits, one or more local circuits each having an indicating device responsive to a change in any alarm-circuit, and a testing apparatus adapted upon operation to successively connect said test-indicating device with the several alarm-circuits to be actuated thereby, and to also effect the operation of each local-circuit indicating device, said testing apparatus including a rotatable disk and a recording-dial about which said several indicating devices are grouped, to produce by their coöperation with the dial a separate record of the condition of each local circuit simultaneously with the test-record of each alarm-circuit.

11. A protective system comprising a plurality of duplex, normally-open alarm-circuits, a common test-indicating device for said alarm-circuits including a recording member, one or more local circuits each having a vibrating bell and an indicating device responsive to a change in any alarm-circuit, each indicating device including a recording-stylus vibratable in unison with the bell, and a testing apparatus having a rotatable disk provided with a recording-dial adjacent to which the recording members of the several indicating devices are located, combined with a fire-alarm system, and means controlled by rotation of the disk to cut out the fire-alarm system during a test, operation of the testing apparatus connecting said test-indicating device successively with the alarm-circuits to effect the operation of its recording member, the stylus of each operative local-circuit indicating device recording upon the dial the vibrations of its corresponding bell for each test of an alarm-circuit.

In testimony whereof I have signed my name to this specification in the presence of two subscribing witnesses.

EDWARD F. WOODMAN.

Witnesses:
T. P. BUTMAN,
JOHN C. EDWARDS.